United States Patent [19]

Bell

[11] Patent Number: 5,216,234
[45] Date of Patent: Jun. 1, 1993

[54] TOKENS HAVING MINTED IDENTIFICATION CODES

[75] Inventor: Edward H. Bell, Chambersburg, Pa.

[73] Assignee: Jani Supplies Enterprises, Inc., Havertown, Pa.

[21] Appl. No.: 501,239

[22] Filed: Mar. 29, 1990

[51] Int. Cl.[5] ............... G06K 19/06; G06K 7/10; G06K 7/14; G07B 15/00

[52] U.S. Cl. ............................. 235/494; 194/901; 235/454

[58] Field of Search ............ 235/464, 494, 487, 454, 235/462; 194/328–331, 901, 903

[56] References Cited

U.S. PATENT DOCUMENTS

| | | | |
|---|---|---|---|
| 2,410,845 | 11/1946 | Snell et al. | 40/27.5 |
| 2,983,354 | 5/1961 | Ember et al. | 194/211 |
| 3,171,020 | 2/1965 | Lord | 235/61.11 |
| 3,418,456 | 12/1968 | Hamisch et al. | 235/464 |
| 3,599,771 | 8/1971 | Hinterstocker | 194/100 A |
| 3,643,068 | 2/1972 | Mohan et al. | 235/464 |
| 3,741,363 | 6/1973 | Hinterstocker | 194/100 A |
| 3,926,291 | 12/1975 | Burke et al. | 194/4 F |
| 3,991,883 | 11/1976 | Hobler et al. | 235/494 X |
| 4,004,131 | 1/1977 | Oneil, Jr. et al. | 235/494 |
| 4,089,400 | 5/1978 | Gregory, Jr. | 194/329 |
| 4,292,511 | 9/1981 | Heyman et al. | 235/464 X |
| 4,371,071 | 2/1983 | Abedor et al. | 194/4 R |
| 4,449,042 | 6/1984 | Hampson et al. | 235/464 |
| 4,493,989 | 1/1985 | Hampson et al. | 235/464 |
| 4,625,101 | 11/1986 | Hinks et al. | 235/462 |
| 4,814,589 | 3/1989 | Storch et al. | 235/375 |

Primary Examiner—John W. Shepperd
Assistant Examiner—Christopher R. Glembocki
Attorney, Agent, or Firm—Eckert Seamans Cherin & Mellott

[57] ABSTRACT

A token for use, for example, in the gaming, vending, toll collection and amusement industries, has identifying indicia for automated discrimination of a token identification such as the issuing entity, denomination or the like. The token has a body, substantially shaped as a flat disk having opposite surfaces, with code marks impressed or minted directly into the token face surfaces on one or both opposite sides. The identification marks include surface variations aligned at least partly at an angle relative to a plane of the token surface, the marks being detectable as reflective or non-reflective variations, for example by an optical detector or by an optical emitter-detector pair. The identification marks can be annular rings or transverse variations elongated in a direction extending from a center to an edge of the token, which token preferably is round. The code of a particular token is determined by at least one of presence of an identification mark or pattern at a defined location, spacing of identification marks, and correspondence or non-correspondence of marks on opposite sides or in different areas of the token. The code is detectable as the token moves past a detector and spin of the token is irrelevant.

7 Claims, 2 Drawing Sheets

TOKENS HAVING MINTED IDENTIFICATION CODES

BACKGROUND OF THE INVENTION

1. Field of the Invention

This invention relates to the field of check controlled devices, token discriminators, sorters and the like, for discriminating the identity of tokens such as those used in the gaming, vending, toll collection and amusement industries. In particular the invention concerns a means for encoding a token with an identification by minting code-indicating surface variations directly into the token surface, the particular form of the variations, and a discriminating apparatus operable to read the identification codes.

2. Prior Art

Tokens used in the gaming, vending, toll collection and amusement industries are intended to be issued and reused repeatedly and many are handled extensively in normal use. As a result, reflective variations which are provided on printed labels or printed directly on the token tend to wear off. Tokens are often transported in bulk, and the tokens tend to wear against one another. The metallic nature of coin type tokens and their handling in bulk aggravate problems with wear of any labels printed or affixed on the coins and make it impractical to use bar code labels or printed indicia for marking codes to indicate the token's denomination or the issuing entity.

With increasing use of automated token issuing and discriminating machinery, the security interest of the issuing authority is acute. It is important to provide a means by which tokens can be automatically discriminated, for example for purposes of acceptance in a denomination-specific machine as well as for sorting of tokens. In the latter case, it should also be noted that federal regulations prohibit general use of privately minted tokens as a form of currency. Casinos, transit authorities and the like who issue tokens for customer use are not permitted to honor the tokens of other casinos, transit agencies, etc. However, there are so many different issuing entities and so many different currencies and possible denominations that the dimensions, weight, magnetic permeability and other characteristics of metal tokens are not really adequate to distinguish among the many different tokens. For example, a small denomination token issued by an agency in one country may be indistinguishable by practical known automated means from a large denomination token issued by another agency in another country. As a result, token accepting enterprises have no real alternative other than to sort through tokens for incorrect denominations, counterfeits and the like by visually inspecting the tokens for the text, portraits or other visual artwork and indicia making the token unique. Such visual artwork can be detected automatically to only a limited extent and computerized scanning for such visual artwork requires processing time that is not available if the token is to simply drop by a token reader. The expense and complexity of computerized character recognition apparatus capable of discriminating tokens make them unsuitable for use as an inexpensive and compact token acceptor mechanism to be included in token operated mechanisms generally.

There has been a need for a token which can be encoded with a large number of different codes, equal to the number of possible code variations of a bar code, but which cannot easily wear off or become unreadable. The present invention meets this need by providing a means for impressing code variations directly into the surface of the token during minting. The result is a very durable code which cannot easily become obstructed and cannot readily wear off. At the same time, the coding can be unobtrusive and can be incorporated on most forms of tokens with little variation in the artwork which also appears on the minted surface, e.g., names, trademark logos, portraits and the like. The direction and speed of token rotation are not problems because the coding is produced by one of a plurality of techniques which are insensitive to rotation of the token. The code variations can be annular, repetitively produced and/or detected by correlation of variations on opposite sides of the token, which of course are spinning together if at all. The variations are impressed directly into the token surface and are detectable, for example, by inclined optical detectors past which the token falls in a chute.

SUMMARY OF THE INVENTION

It is an object of this invention to produce a token with durable code markings by which the token can be automatically identified when falling through a chute at an unknown rotational speed and direction.

It is another object to encode data on a token which is visually similar to a simple minted coin.

It is a further object of the invention to encode data on a token by controlling a relative positional displacement of detectable variations minted into the opposite sides of the token.

It is still another object of the invention to improve the security of privately minted tokens such that tokens can be safely assigned large values by minimizing the danger of fraud and counterfeiting.

These and other objects are accomplished by a token having identifying indicia, for automated discrimination of token identity with respect to issuing entity, denomination or the like. The token has a body, substantially shaped as a flat disk, with code marks impressed or minted directly into the shape of the token face surfaces on one or both opposite sides of the disk. The identification marks include surface variations aligned at least partly at an angle relative to a plane of the token surface, the marks being detectable as reflective or nonreflective variations, for example by an optical detector or by an optical emitter-detector pair. The identification marks can be annular rings or transverse variations elongated in a direction extending from a center to an edge of the token, which token preferably is round. The code of a particular token is determined by at least one of presence of an identification mark or pattern at a defined location, spacing of identification marks, and correspondence or non-correspondence of marks on opposite sides or in different areas of the token. The code is detectable as the token moves past a detector and the spin and direction of movement of the token are irrelevant.

BRIEF DESCRIPTION OF THE DRAWINGS

There are shown in the drawings the embodiments which are presently preferred. It should be understood that the invention is capable of embodiment by means of other combinations and groupings of its sub-elements in accordance with the scope of this disclosure. The drawings should be interpreted as exemplary rather than as limiting. In the drawings.

DETAILED DESCRIPTION OF THE PREFERRED EMBODIMENTS

This invention relates in general to a token identification system and method, and a token therefor, arranged to address problems associated with conventional means for identifying tokens. In this regard, "identifying" can be construed to include confirming the validity of tokens, their denominations, their issuing entity or the like, and for sorting the tokens or operating machinery in dependence upon data embodied in the token. Specifically, the data embodied by the token is data that is durably minted directly into the token surface, preferably on both opposite faces of the token, in a manner that can be read dependably for a first-time valid identification as the token moves through a chute. When passing the detector the token can be spinning in either direction or not spinning at all.

The invention is discussed herein primarily with respect to metal coin-like tokens but is applicable to other materials as well. The invention is also discussed with respect to optical illumination and detection, but is also applicable at other radiation wavelengths.

A preferred method of impressing marks on the token involves the production of reflective areas on the surface of the token that are interpreted as codes by optical detectors placed along the path through which the token moves in a chute. The marks can be arranged in a pattern of areas having greater or lesser reflectance to an illuminating sensor beam. Preferably, the marking scheme includes placing a pattern of binary reflectance/non-reflectance variations on both sides of the token, the correspondence of the patterns on the opposite sides being one way in which the information can be encoded. This provides a large number of different code possibilities but takes up only a small area of the token. In addition, encoding both sides and comparing the detected codes makes the apparatus insensitive to spinning of the free falling token, since both sides of the integral token body obviously spin at the same speed and in the same direction.

Figure 1:
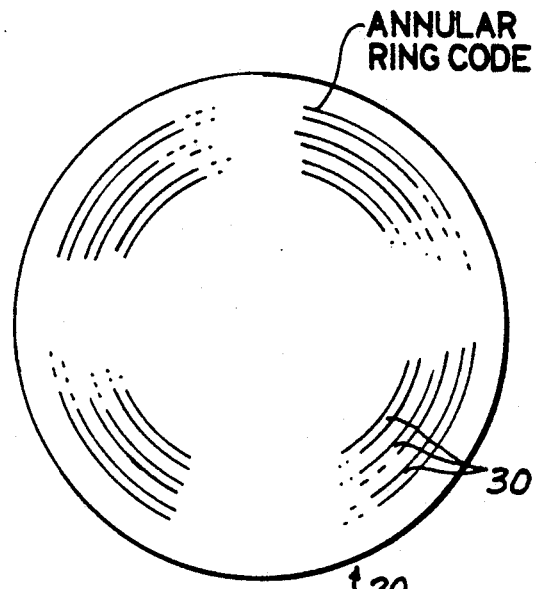
FIG. 1 is a plan view of a token having data encoded by means of minted surface variations, according to a first embodiment including annular code rings.
Figure 2:
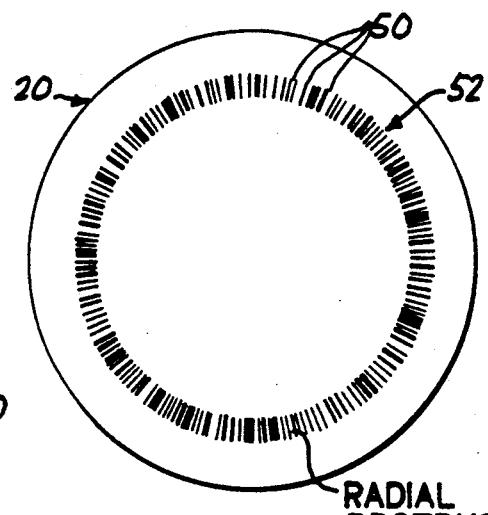
FIG. 2 is a plan view of a token according to another embodiment, having data encoded in transverse surface variations, elongated radially and defining an annular band.

Two preferred methods of encoding information in patterns on opposite sides of the token are illustrated in FIGS. 1 and 2. In FIG. 1, the token 20 is provided with a plurality of annular rings 30, on one or preferably both sides 22, 24. When the token 20 of FIG. 1 falls past a detector 124 such as a photodiode or phototransistor, schematically shown in FIG. 6 in a split view of the tokens and detectors, the annular rings are sensed and used to develop a time-varying electrical signal as a function of reflectance. The annular rings can be made in one size, or in varying sizes such that the level of the reflectance signal distinguishes larger and smaller rings, the two (or more) levels being used for coding. Preferably, the annular rings are all the same size but are provided to include gaps and/or phasing variations that are detectable by analog or digital techniques for encoding and decoding information. The specific structures and functions of the minted-in surface variations are discussed hereinafter in greater detail.

Figure 6:
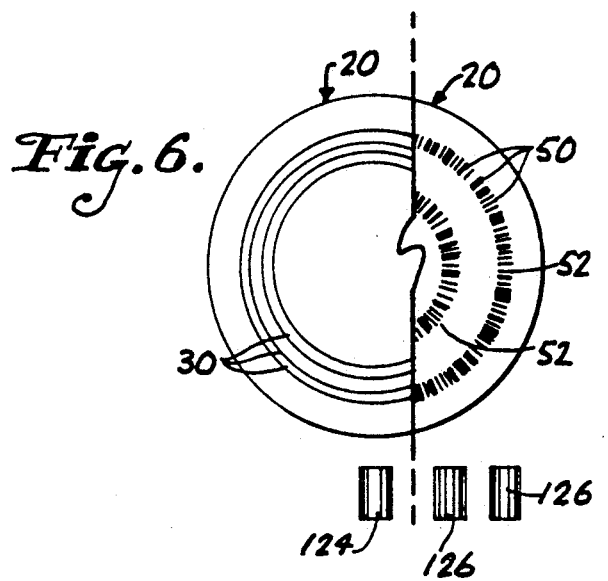
FIG. 6 is a split elevation view showing the relative positions of the detectors and the data bearing indicia for falling tokens according to the embodiments of FIGS. 1 and 2.

As shown in FIG. 2, according to another embodiment of the invention, coding can be embodied in one or more annular bands 52 of reflectance-varying protrusions 50, each elongated from the center to the edges of the token. In FIG. 2 the protrusions 50 are elongated radially, however it will be appreciated that the token need not be round, but could be polygonal, oval or otherwise shaped. These transversely oriented variations 50 can be detected along at least an area of the token by means of detector 126 in FIG. 6, which passes a chord of the annular band 52 as the token falls past the detector in the token chute. As also illustrated in FIG. 6, a plurality of such annular bands 52 can be included on the token, spaced radially from one another and each sensed by an optical detector 126 at a different spacing from the centerline of the chute.

According to both FIGS. 1 and 2, the means 30, 50 producing detectable reflectance variations on the surface of the token are minted directly into the surface of the token. More particularly, the reflectance variations result from protrusions or other surface variations which are stamped directly into the token 20 when it is produced. The surface variations can define an angled flat or curved surface distinct from the plane of the token surface. The token is normally but not necessarily round and is shaped substantially as a flat disk. By controlling the particular angle and/or shape of the distinct surfaces impressed in the disk relative to the plane of the surface, the variations are made detectable using an optical detector. The detector, for example, is inclined relative to the plane of the token surface and positioned relative to an illumination means to produce a signal when a surface at the required angle passes, and not otherwise.

Figure 3:
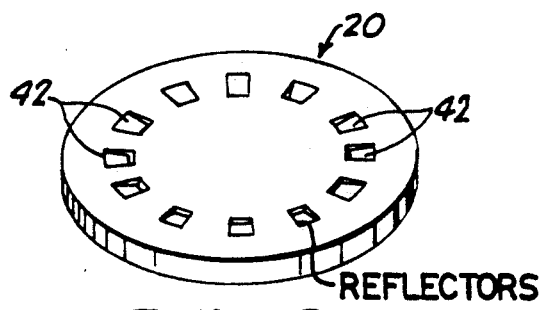
FIG. 3 is a perspective view of a further embodiment of the token, having a plurality of aligned reflective surfaces.
Figure 4:
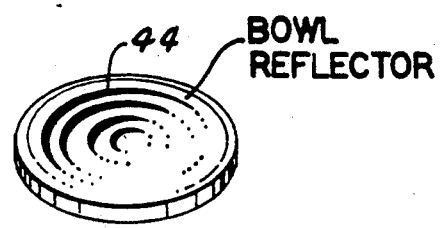
FIG. 4 is a perspective view of an embodiment having a token identifiable by means of a focal length defined by its surface.

FIGS. 3 and 4 illustrate variations on the concept, wherein the token identification is embodied in a surface or plurality of surfaces shaped and/or aligned to define a reflector 44 having one or more discrete focal lengths by which the token can be discriminated from other tokens which have surfaces aligned at other angles. In FIG. 4, an area of a face of the token is bowl shaped to define a spherical reflector having a predetermined focal length. The area may include the whole face of the token as shown in FIG. 4, or only a limited part of the area, for example at the center. If the token is subjected to illumination by means of a collimated light source, the surface will reflect all the incident light to a point spaced from the token by a distance equal to the focal length of the reflector. An optical detector positioned at this point will detect the focused reflected light as the token moves past the detector in the token chute. Tokens which lack the reflector at the required focal length will emit unfocused diffuse light and will not produce the required optical signal.

In FIG. 3, the same idea is employed, however the reflective surface is discontinuous. A plurality of minted-in surfaces 42 together define one or more reflectors having a predetermined focal length. The individual surfaces are inclined relative to the plane of the token, and can all be segments of a spherical reflector surface as in FIG. 4. Alternatively, the individual segments can be inclined at different angles (i.e., focal lengths) whereby reflectors having two or more discrete focal lengths or focal points are provided and can be detected by optical detectors at different distances or angles from the token, the latter being illuminated by collimated light as above.

The surface variations producing reflectance variations can be included in a minting die by the same means used conventionally to obtain visually perceptible indicia such as portraits, logos, etc. This master die is used to strike tokens from metal blanks in a die stamping operation in which the internal surface configuration of the master is impressed in the metal blank.

Figure 7:
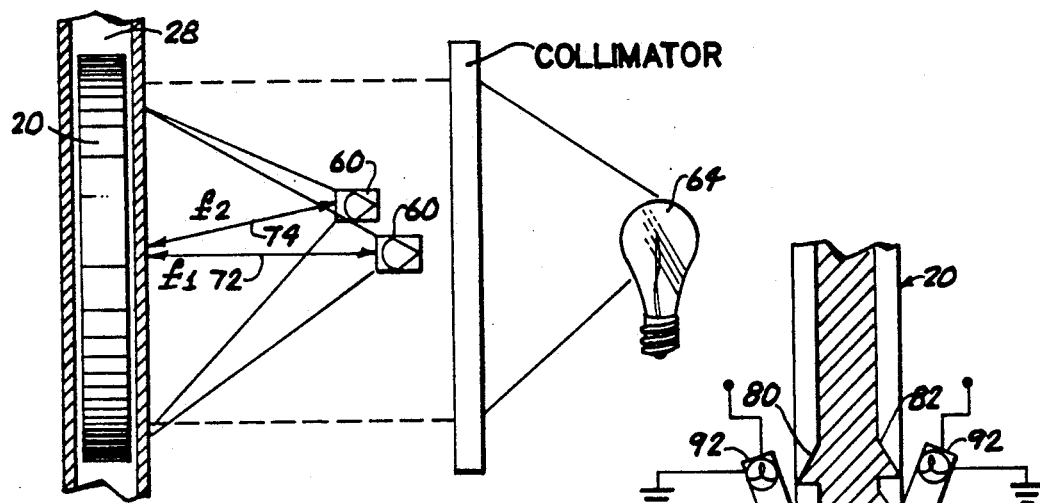
FIG. 7 is a partial section view through a token and detector according to the embodiments of FIGS. 3 or 4.

FIG. 7 illustrates detection of reflectance variations arranged to define a reflector having one or more discrete focal lengths or focal points. A collimator 68 such as a spherical collimating lens, fresnel lens or the like is placed at a distance from an illuminating lamp 64 equal to the focal length of the collimator 68. Accordingly, parallel light rays from the lamp 64 are directed on the token 20 moving through chute 28. The rays can be directed on the token through an opening or through a transparent window in the chute. The inclined surfaces 42 or 44 minted into the token reflect this incident light to a point located at the corresponding focal length $f_1$ or $f_2$. An optical detector 60 is positioned at the focal point and receives the reflected light as the token having the required focal length areas passes. As also shown in FIG. 7, more than one detector can be provided at different focal lengths or focal points to discriminate for more than one focal length or for combinations of focal lengths in a given token. The reflective areas 42 can be placed so as to define reflectors which are canted relative to the axis of the token (i.e., aligned in a direction not parallel to the center line defined by a central line normal to the token) and/or to define reflectors which focus on points off the axial center due either to canting of their optical centerlines or displacement laterally of the centerline. In this event, a second detector can be displaced from the first to avoid shadow problems. However, the orientation of the token is unknown, and if a reflector is canted it is necessary to use a ring-like light collector or a plurality of second detectors defining a ring at the required radius to receive the reflected beam.

A preferred embodiment of the minted-in reflectively varying token includes a plurality of protrusions placed in annular rings or transverse bands as in FIGS. 1 and 2, respectively. A specific structure for the protrusions in either of these types of encoding means is illustrated in detail in FIG. 8. As shown, the individual protrusions 80 are preferably provided on both opposite sides of the token, and the protrusions on the opposite sides do not coincide, in at least one of their number and their positioning. Accordingly, the correspondence of the protrusions and/or the relative spacing of the protrusions can be used to encode additional possible combinations of token codes, for uniquely identifying or classifying tokens automatically.

Figure 5:
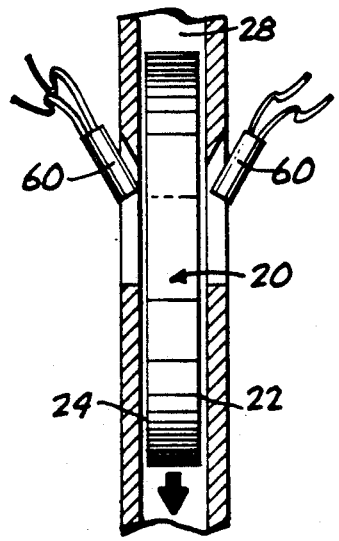
FIG. 5 is a partial section view through the token chute of a token reader according to the invention.

FIG. 5 illustrates a cross section through a token chute 28. The token 20 is provided with minted-in detectable surfaces angled to the plane of the token surface on both opposite sides 22, 24. Optical detectors 60 are positioned on both opposite sides 22, 24 and are inclined relative to the planes of the token surfaces such that the detectors 60 are aligned normal to reflective faces of the protrusions 30 or 52. The protrusions 30 or 52 are spaced, gapped and/or relatively positioned to define identification codes. Detectors 60 can include both light emitting and detecting means, operative directionally such that detectors 60 produce a signal when a surface aligned perpendicular to the axis of view passes in the chute 28. The surfaces of the minted token apart from the faces aligned at the required angle, reflect the emitted light in directions other than back to detectors 60.

The protrusions 80 include reflective surfaces 82, which are inclined relative to the plane of the token. The protrusions are annular bands shown in cross section through the token in FIG. 8, to be read by a detector positioned as on the left side of FIG. 6. The same relative arrangement of protrusions to an illuminating and detecting means is also provided in connection with the transverse bands of protrusions (as in FIG. 2 and in the right side of FIG. 6). Transversely elongated protrusions in an annular band are detectable over a portion of the token, i.e., that much of the chord defined by the annular band 52 as passes more-or-less perpendicularly in front of the detector 126. Preferably, the reflective surfaces are parallel to planes which intersect the center of the token, whereby reflections from the protrusions in one annular band 52 are directed toward one detector 126. It is also possible to arrange the reflective faces in a single annular band 52 to reflect in different directions, and to provide more than one detector 126, laterally spaced such that each is responsive to certain of the reflective faces in a single annular band.

Figure 8:
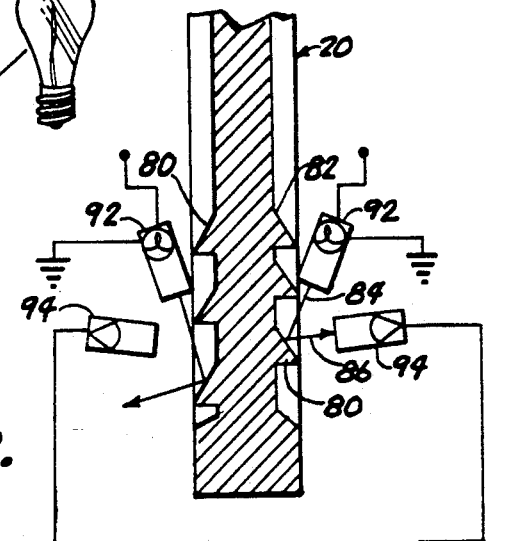
FIG. 8 is a partial section view through a token, showing detection of data encoded on both sides of a token; and, FIGS. 9, 10 and 11 are timing graphs showing signals developed according to alternative embodiments of the token as shown in FIG. 8.

As schematically illustrated in FIG. 8 in connection with annular bands, the protrusions 80 are illuminated by a directional light beam 84 from an inclined lamp source 92. For example, the light from source 92 can be collimated and/or masked to make it directional. Reflected rays 86 from an inclined surface 82 of the protrusions 80 are detected by an optical detector 94, which is inclined and positioned such that only the reflected light from a surface 82 at the required angle will be detected. Incoming light to detector 94 can also be collimated or masked. Inasmuch as the surfaces 82 of the annular rings 30 or transverse protrusions 50 are small in area, less light is included in the reflected beam 86 than in the embodiments according to FIGS. 3 or 4. Nevertheless, sufficient light can be detected to develop a digital signal that carries the information encoded on the surface of the token by reflective and non-reflective zones inherent in the annular rings 30 or bands of transverse protrusions 50. Examples of the signals developed according to several preferred encoding techniques are shown in FIGS. 9-11.

Figure 9:
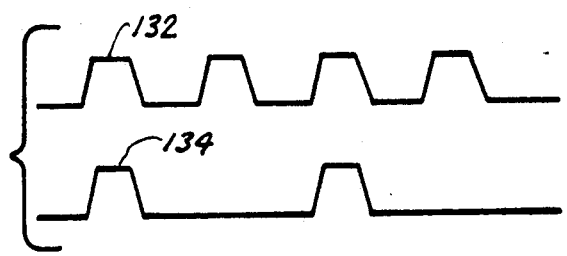

A first encoding technique is illustrated in FIG. 9 and relies upon missing or extra bits (reflective variations) as sensed on one side of the token, compared to that sensed on the opposite side. A similar technique can be used to sense for missing or extra bits in the transverse protrusions of discrete annular bands as on the right side of FIG. 6, instead of or in addition to sensing on opposite sides of the token. The signals 132, 134 developed from the different sources (opposite sides or discrete bands) appear as distinct digital signals when sensed by the optical readers. The number of bands and the correspondence of the bands can be discriminated by digital gating or state techniques, or a digital processor can be programmed to compare the sensed sequence of digital pulses to expected sequences for determining the identity of a token. Inasmuch as the signals developed on the opposite sides (or different bands) are thereby compared, the apparatus is insensitive to the speed or rotation of the token. Any variations in speed or spin will of course be common to both sides or both bands.

Figure 10:
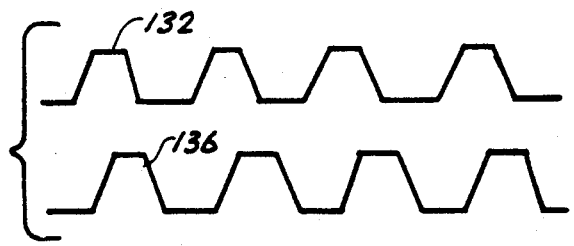
Figure 11:
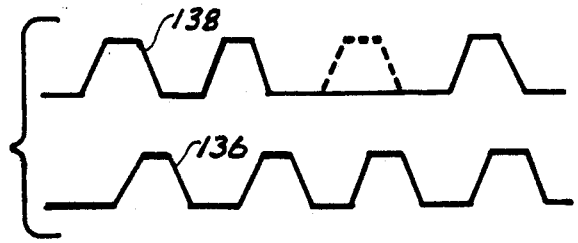

According to a second technique, as illustrated in FIG. 10, the protrusions can be varied in their alignment for opposite sides of the token or for different bands. This produces a phase difference between the signals 132, 136 developed from the different sources. The existence of the phase difference and/or the extent of phase difference can be made unique to define a particular identification code. This technique is also insensitive to the speed a token falls or rotates. The phase difference can be produced by rotationally displacing a same pattern of radially elongated protrusions 52 when minting the opposite sides of the token, e.g., when mounting the master dies to mint the tokens. A similar phase difference can be obtained by laterally displacing a same pattern of annular code rings 30 on the opposite sides FIG. 11 illustrates a combination of the techniques of FIGS. 9 and 10. The signals 136, 138 developed by the two (or more) detectors are delayed in phase and missing bits are included on at least one side by leaving gaps in the protrusions 80 of respective annular protrusions or transverse protrusions in an annular band. The sequence of protrusions and gaps defines the code. According to this embodiment, the digital pulses 136 developed from one of the two detectors can be used to clock a counter or shift register for producing a code pattern using the other detector's signal 138 as a data input. In this manner a multi-digit code can be detected on the token for categorizing or uniquely identifying the token.

The electronics contained in code discriminator 160 for discriminating data from the signals developed from the reflections of the token surfaces can be varied. Typically, analog signals from the detectors 94 are digitized by comparing them with a threshold, using one or more comparators. The outputs of the comparators are used as data or clocking inputs to digital circuits responsive to particular attributes of the signals. The digital circuits can include a programmed processor or can be as simple as a number of latches or flipflops and gates sensitive to a particular combination of bits or timing of pulses.

According to each of the preferred embodiments discussed herein, the specific detectable pattern of bits can be repetitive or error correcting in nature. In this manner the detector apparatus is insensitive to damage to the protrusions due to wear and dirt, which may interfere with reading certain of the protrusions.

There are many additional possibilities for the structure and alignment of specific reflective faces, detector alignments and coding techniques. Provided reflective surfaces are minted directly into the surface of the token, detection and discrimination of identification codes that uniquely identify a token issuing entity, a denomination, a single token (e.g., of a large denomination) or other needed information are readily made possible.

The invention as disclosed herein is a token 20 having identifying indicia for automated discrimination. The token has a token body, substantially shaped as a flat disk having opposite surfaces 22, 24. A plurality of identification marks 30, 32, 42, 44 are impressed in at least one of the opposite surfaces 22, 24, the identification marks including surface variations 82, 42, 44 aligned at least partly at an angle relative to said at least one of the opposite surfaces and depressed therein, the angular variations being optically detectable and defining a code 132, 134 representing an identification of the token 20. The identification marks can be disposed in annular rings 30 on said at least one of the opposite surfaces 22, 24, the code being determined by at least one of presence of an annular ring at a defined location, and spacing of a plurality of annular rings, the annular rings being detectable as the token 20 falls past a detection apparatus 124, 92, 94. The annular rings 30 are preferably reflective at least at a predetermined angle relative to an axis defined by the disk, but can also be detected by virtue of being non-reflective at least at a predetermined angle relative to an axis defined by the disk.

The identification marks 30, 50, 80 can be disposed on both sides 22, 24 of the disk 20. The code can be determined at least partly by the numerical or spatial correspondence of the protrusions 80 on said opposite sides. Identification marks 80 on one side of the disk can define timing correspondence marks for detecting a code value of said identification marks on the opposite side of the disk.

The identification marks 80 can include at least one band 52 of transverse surface variations 50 elongated in a direction extending from a center to a perimeter of the disk, the transverse surface variations within said band 52 defining a detectable code. The transverse surface variations 50 are reflective at least at a predetermined angle relative to a plane of the disk, and/or non-reflective at a predetermined angle relative to the plane of the disk. The transverse surface variations, like the annular rings, can be provided on both opposite sides of the disk, the detectable code being determined by at least one of a spacing of the transverse surface variations and correspondence of said transverse surface variations on said opposite sides of the disk. The transverse surface variations can define at least two discrete annular bands 52 on one or both sides of the token, the transverse surface variations in at least one of the bands forming timing correspondence marks for detecting a code value defined by transverse surface variations in another of the discrete annular bands.

The invention also encompasses an apparatus for discriminating identification marks on tokens of the defined type, the apparatus including a token guide track or chute 28 along which the token 20 passes, at least one optical detector 60, 92, 94, 124, 126 operable to discriminate surface variations 80, 30, 32, 50 along a line within and parallel to the token guide track 28. Code discriminating means 160 are responsive to the at least one optical detector 94, 94, the code discriminating means determining an identification code of the token from at least one of a spacing and a presence of surface variations in the token. The optical detector is preferably positioned to detect one of annular rings 30 on a surface 22 or 24 of the token 20, and transverse surface variations 52 extending from a center to an edge of the token 20. The code discriminating means 160 can be operable to compare at least one of a correspondence and a relative position of one of said annular rings 30 and said transverse surface variations 50 at different areas of the token 20. An optical detector is preferably provided on both opposite sides of the token and the code discriminating means is operable to compare at least one of a correspondence and a relative position of optical variations in the token on both opposite sides.

The invention having been disclosed, a number of further alternatives and additional embodiments will become apparent to persons skilled in the art. Reference should be made to the appended claims rather than the foregoing specification in assessing the scope of exclusive rights claimed.

I claim:

1. A token representing a unit of value, the token having identifying indicia for automated discrimination, comprising:

a token body, substantially shaped as a hard, thin flat disk having opposite surfaces, the token body being substantially coin sized for reception in an automated check-controlled device;

a plurality of identification marks impressed into both of the opposite surfaces, the identification marks including surface variations defining annular rings extending around a periphery of the token body, the annular rings having reflective surface walls inclined at predetermined angles relative to a plane of said opposite surfaces such that the walls are detectable by incident and reflected light aligned to the predetermined angles, the surface variations being spaced and positioned on the token body to define a code representing a value identification of the token, wherein the code being defined at least partly by presence or absence of an annular ring on one of the opposite surfaces at a predetermined location relative to an annular ring on the other of the opposite surfaces, whereby the annular rings are detectable as the token moves past a detection apparatus having sensors directed toward each of the opposite surfaces.

2. The token of claim 1, wherein at least certain of said identification marks on one of the opposite surfaces of the disk define timing correspondence marks for said identification marks on the other of the opposite surfaces, whereby the token is identifiable.

3. The token of claim 1, wherein the annular rings on both opposite sides of the disk are irregularly spaced.

4. A token representing a unit of value, the token having identifying indicia for automated discrimination, comprising:

a token body, substantially shaped as a flat disk having opposite surfaces;

a plurality of identification marks impressed into both of the opposite surfaces of the token body, the identification marks including surface variations defining annular rings extending around a periphery of the token body, the annular rings having reflective surface walls inclined at predetermined angles relative to a plane of said at least one of the opposite surfaces such that the walls are detectable by incident and reflected light aligned to the predetermined angles, the surface variations being spaced and positioned on the token body to define a code representing an identification of the token, and wherein the identification marks on one of the opposite surfaces of the disk include regularly spaced annular rings forming timing correspondence marks and the code is defined in part by existence or absence of an annular ring on the other of the opposite surfaces of the disk at a position corresponding to one of the timing correspondence marks, the regularly spaced annular rings being disposed to define a phase difference relative to the annular ring on said other of the opposite surfaces.

5. A token having identifying indicia for automated discrimination, comprising:

a token body, substantially shaped as a flat disk having opposite surfaces;

a plurality of identification marks impressed into at least one of the opposite surfaces, the identification marks including surface variations having reflective surface walls inclined at predetermined angles, the reflective surface walls being arranged such that a plurality of said walls concentrate reflected light at a point, whereby presence of the identification marks is detectable by detection of reflected light at the point while illuminating the token along at least one angle oriented to reflect light from the reflective surface walls to the point, and wherein the identification marks include at least a band of transverse surface variations elongated in a direction extending from a center to a perimeter of the disk and arranged to concentrate reflected light at the point, the transverse surface variations within said at least one band thereby encoding an identity of the token.

6. The token of claim 5, wherein the transverse surface variations in said band all are reflective at a same predetermined angle relative to a plane of the disk, whereby collimated light is reflected by the surface variations to the point and the point is disposed on an axis defined by the disk.

7. The token of claim 5, wherein the identification marks include at least one band of said transverse surface variations on both opposite sides of the disk, the detectable code being determined by reflection of light to at least one said point located on each of said opposite sides of the disk.

* * * * *